April 19, 1966   C. E. WADE   3,246,793
SEALING CLOSURE
Original Filed July 31, 1963   2 Sheets-Sheet 1
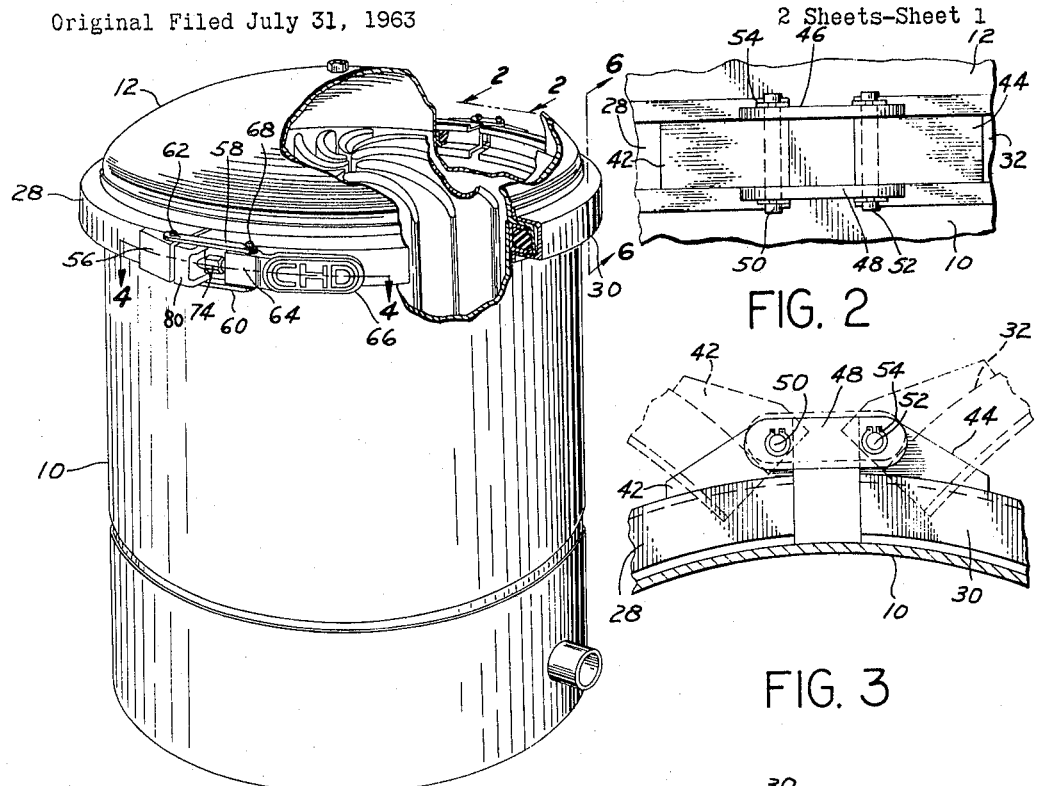
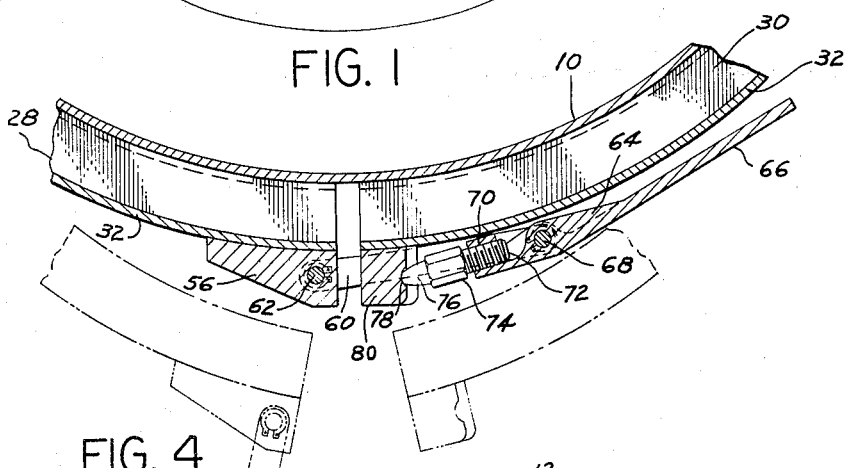
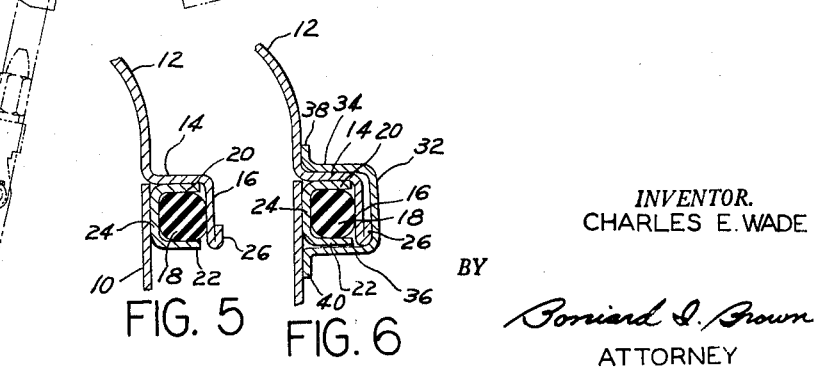
*INVENTOR.*
CHARLES E. WADE
BY Bernard I. Brown
ATTORNEY April 19, 1966 C. E. WADE 3,246,793
SEALING CLOSURE Original Filed July 31, 1963 2 Sheets-Sheet 2

INVENTOR.
CHARLES E. WADE

BY

*Boniard I. Brown*

ATTORNEY

# United States Patent Office 3,246,793
Patented Apr. 19, 1966

3,246,793
SEALING CLOSURE
Charles E. Wade, 18238 Gragmont, Covina, Calif.
Continuation of applications Ser. No. 303,195, July 31, 1963, and Ser. No. 398,838, Sept. 21, 1964. This application Sept. 7, 1965, Ser. No. 489,799
6 Claims. (Cl. 220—46)

The present application is a continuation of application Serial No. 303,195, filed on July 31, 1963, and of application Serial No. 398,838, filed on September 21, 1964, both abandoned.

The present invention relates generally to sealing closures; more particularly, the invention relates to connectors for securing sections of fluid systems in fluid-sealing relation.

A variety of closures and connections have heretofore been utilized for securing in fluid-sealing relationship adjacent sections of fluid conduits and containers. Many of these have been characterized by a number of disadvantages and shortcomings. Assembly or engagement and disengagement have often been relatively difficult and time-consuming. Many closures have been relatively complex, requiring special components or devices. Some have required tools or machines for effecting engagement or disengagement. Relatively heavy structures and components have often been required because stresses and strains have been unevenly distributed in the structures being joined or in the sealing and securing components.

The present invention provides sealing closures for connecting sections of fluid systems, wherein a resilient sealing element is retained on one section and a skirt is provided on a second section which engages the resilient sealing element and which is configurated to compress the sealing element to provide pressure sealing. The sealing element is preferably retained in a channel provided on one section and the sealing element extends radially outward. Means are provided for securing the sections together, preferably clamping ring means disposed about the skirt and the retaining channel. The skirt portion of the second section and the sealing element on the first section may provide the pressure sealing between the sections without the cooperation of other components, the skirt engaging the periphery of the sealing element to compress the sealing element and provide pressure sealing between the skirt and the sealing element. Clamping means disposed about the skirt and the sealing element may provide radial constrictive force on the skirt to effect either part or all of the compression of the resilient sealing element to provide the pressure sealing between the sections. The clamping means may preferably comprise hinged sections of channel-shaped cross-sectional configuration which fit about the skirt and the retaining channel, and means for drawing together the unhinged end portions of these sections to exert radial constrictive force on the skirt and sealing element. A toggle lever assembly may be utilized for drawing the end portions of the hinged sections together.

The sealing closure of the invention effects pressure sealing between fluid system sections by the mere urging together or positioning of the sections in their adjacent relation. Loads and stresses are distributed substantially uniformly throughout the circumferences of the sections joined, as well as the components of the sealing closure. This permits the use of relatively thin or light components and sections, and eliminates the need for special components and features such as heavy flanges and bolts. The sealing closure is efficiency and readily engageable and disengageable. A minimum of skill, time and labor of an operator are required for engagement or disengagement.

It is therefore an object of the present invention to provide a new and improved sealing closure.

An object of the invention is to provide a sealing closure capable of effecting positive pressure sealing between fluid system sections upon the urging together of the sections, without requiring special components, tools or devices.

It is an object of the invention to provide a sealing closure or connector wherein sealing and securing forces are distributed substantially uniformly through the sealing components and the sections being joined, thereby permitting the utilization of relatievly thin or light components and sections, and eliminating need for heavy components or special structures.

An object of this invention is to provide a sealing closure which is efficiently and readily engageable and disengageable.

It is an object of the present invention to provide a sealing closure or connector for providing positive sealing between fluid system sections, which is engageable and disengageable with a minimum of skill, time and labor of an operator.

An object of this invention is the provision of a sealing closure according to the foregoing objects wherein clamping ring means of channel-shaped cross-section secure the fluid system sections together.

It is an object of the invention to provide a sealing closure for fluid system sections wherein clamping ring means of channel-shaped cross-section are constricted against a skirt of one section to compress a resilient sealing element on another section to provide pressure sealing between the sections.

An object of the present invention is to provide a sealing closure or clamping connector according to certain of the foregoing objects, wherein the clamping ring means are constricted by means of a lever-operated toggle-link assembly connected with sections of the clamping ring means.

Other objects, features and advantages of the present invention will become apparent to those versed in the art from a consideration of the following description, the appended claims and the accompanying drawings, wherein:

FIGURE 1 is a perspective view, partially in section, showing a sealing closure of the invention in engagement to provide fluid pressure sealing between a body section and a cover section of a fluid tank;

FIGURE 2 is a fragmentary elevational view, taken at line 2—2 in FIGURE 1, illustrating a hinged connection between the sections of a clamping ring assembly utilized with the invention;

FIGURE 3 is a fragmentary plan view of the hinged connection of FIGURE 2, showing portions of the clamping ring sections in both closed and open positions;

FIGURE 4 is a sectional plan view taken at line 4—4 in FIGURE 1, showing a toggle link assembly of the sealing closure of FIGURE 1 in closed position in solid lines and in open position in phantom outline;

FIGURES 5 and 6 are similar fragmentary cross-sectional views, FIGURE 6 being taken at line 6—6 in FIGURE 1, showing elements of the sealing closure of the invention in different stages of assembly;

Figure 7:
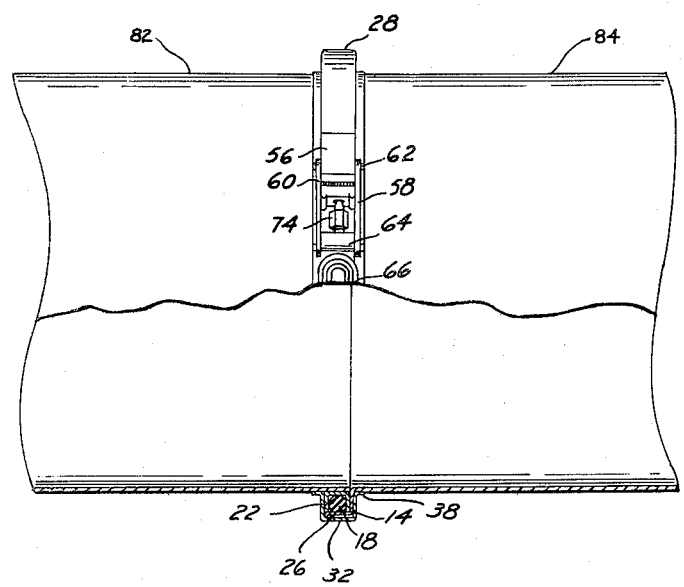
FIGURE 7 is an elevational view, partially in section, showing the sealing closure of the invention connecting adjacent pipe sections of a fluid conduit.

Referring to the drawings, and particularly to FIGURES 1 and 7, a preferred embodiment of the sealing closure of the invention is shown in operative engagement with the cover and body sections of a fluid pressure tank and with adjoining pipe sections of a fluid conduit. In FIGURE 1 is illustrated a fluid container or pressure tank having a body section 10 and a cover section 12. The cover section has a cylindrical wall portion and a radially extending shoulder 14 from which depends a skirt portion 16, as indicated in FIGURE 5. An annular resilient sealing element or O-ring 18 is retained in an annular retaining channel defined by flanges 20, 22 extending from opposite edges of a web portion 24. The outer or peripheral portion of the annular sealing element extends radially outward beyond the peripheries of the flanges 20, 22. The edge of the flange 16 is bent to provide a reinforcing rim 26.

A clamping ring or annular clamping cover of channel or U-shaped cross-sectional configuration includes two arcuate or semi-circular sections 28, 30. As indicated in the cross-sectional view of FIGURE 6, each clamping ring section has an annular web portion 32 and flange sections 34, 36, rim portions of the flange portions 38 and 40 being parallel to the web portion. As shown in FIGURES 2 and 3, the clamping ring sections are hinged together by an assembly which includes lugs 42, 44 which are interconnected by links 46, 48 pivotally connected to lug 42 by pin 50 and to lug 44 by pin 52. The pins are secured in the lugs and links by spring clip retaining washers 54.

Referring to FIGURES 1 and 4, a lug 56 is mounted on the end portion of clamp ring section 28 opposite from its hinged one. Toggle links 58, 60 are pivotally connected at opposite sides of lug 56 by a pin 62. The opposite ends of the links are pivotally connected to a base portion 64 of a toggle lever or handle 66 by a pin 68. A threaded shank portion 72 of an adjustment nut 74 is secured in a threaded opening in base portion 64. Extending from the opposite end of the nut is a nose portion 76 which is adapted for pivotal engagement in a recess 78 defined in a lug 80 mounted on the end portion of clamping ring section 30, as shown.

In FIGURE 7 the sealing closure of FIGURES 1 through 6 is shown in operative assembly with adjoining cylindrical sections 82, 84 or pipes of a fluid conduit. The structure of the sealing closure or connector of FIGURE 7 is the same as that hereinbefore described, and the manner of engagement thereof is like that hereinafter described relative to FIGURES 1 through 6.

To engage the sealing closure to effect pressure sealing between the body section 10 and the cover section 12 of the tank of FIGURE 1, the cover section is first positioned with skirt portion 16 disposed about the annular resilient sealing element 18 and the flanges 20, 22 of the retaining channel on the body section, as indicated in FIGURE 5. A peripheral portion of the sealing element extends radially outward beyond the flanges 20, 22. The positioning or urging of the skirt portion of the cover section about the sealing element compresses the sealing element as the skirt 16 presses against the rounded contour of the sealing element. The compressive force is exerted by the skirt all about the circumference of the sealing element to provide continuous pressure sealing.

From the foregoing and from the drawing, it will be understood that positive pressure sealing between the cover section and the body section are effected merely by the urging or positioning of the cover section skirt portion about the resilient sealing element and retaining channel, without the exertion of radial constrictive force by any other component, device or tool. It will be observed that the compressive force or pressure is distributed substantially uniformly about the circumference of the skirt portion and the cover and body sections. Therefore, relatively thin section walls and relatively light or thin sealing component structures may be utilized.

The clamping ring assembly is utilized to secure the tank and body sections together, and may also provide part or substantially all of the compressive pressure on the resilient sealing element by exerting radial constrictive force on the skirt portion 16, in the manner hereinafter described.

To operate or engage the clamping ring, it is first positioned loosely about the skirt portion 16 and the retaining channel, with the unhinged end portions of its sections 28, 30 in positions like those indicated in phantom outline in FIGURE 4. The opposite hinged portions of the sections 28, 30 open or spread in the manner indicated in phantom outline in FIGURE 3 to permit the positioning of the clamping ring about the skirt portion of the cover section. With the channel-shaped clamping ring sections thus loosely disposed about the skirt portion 16 and with the wall section of each clamping ring section engaging the shoulder 14 of the cover section, the toggle handle 66 is moved to position the nose portion 76 in recess 78 of lug 80. The toggle handle is then moved or pivoted about the nose portion 76 and forced inwardly to the closed position shown in FIGURES 1 and 4. During this movement, the pin 68 which is the axis of rotation of the handle, moves over or past the pivot point of nose portion 76. The toggle mechanism is thereby locked in the position shown in FIGURE 4, as will be understood from the geometric relations of the parts. The toggle mechanism is therefore self-locking to firmly secure the clamping ring in closed position. The adjustment nut 74 provides means for adjusting the sealing clamp to provide appropriate radial constrictive force, as hereinafter mentioned.

The constricting of the clamping ring by the operation of the toggle link assembly to draw together the end portions of the clamping ring sections, produces circumferential tension which results in the exertion of radial constrictive force about the circumference of the skirt portion 16. The skirt portion is urged against the resilient sealing element all about the circumference of the element, thereby effecting positive pressure sealing thereabout. The constrictive or compressive force or pressure is exerted substantially uniformly about the circumference of the skirt and sealing element. Forces and stresses in the skirt portion, clamping ring sections, and channel flanges are substantially uniform throughout. Therefore relatively thin or light section walls and sealing component structures may be utilized. The closing or constricting of the clamping ring sections about the cover section shoulder 14 and the flange portion 22 of the retaining channel on the body section 10 serves to secure the cover section 12 and body section 10 together. A strong and effective securement or joint between the sections is effected.

The engagement of the sealing closure to secure the cylindrical pipe sections 82, 84 of FIGURE 7 together in fluid sealing relationship, is the same as that described relative to the tank sections of FIGURE 1.

Separation of the cover section 12 from the body section 10 or the separation of the cylindrical sections 82, 84 of FIGURE 7 is readily effected merely by drawing the toggle handle 66 outwardly from the clamping ring and removing the clamping ring sections from their positions about the skirt portion 16. The cover section 12 may then be lifted from the tank 10, or the cylindrical pipe sections 82, 84 may be pulled apart.

Figure 8:
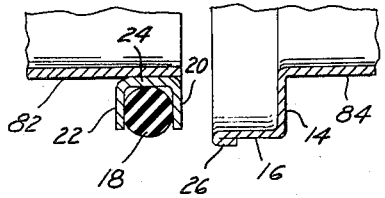
FIGURES 8 and 9 are partial sectional views, showing a modified embodiment of the invention in successive stages of assembly.
Figure 9:
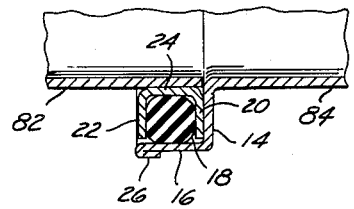

FIGURES 8 and 9 illustrate a modified embodiment of the invention. The structure and operation of this embodiment are like those hereinbefore described, except for the omission of the sealing clamp sections and the toggle link assembly. Sealing compression of the annular resilient sealing element 18 is effected entirely by the skirt portion 16 of the cover section 12 (FIGURE 1) or the cylindrical pipe section 84 (FIGURE 7). The skirt portion 16 is so configurated that, upon the urging together of the cover section 12 and body section 10 or the cylindrical pipe sections 82, 84, the skirt portion 16 exerts appropriate radial constrictive force about the circumference of the resilient sealing element. This compresses the annular resilient sealing element to provide positive pressure sealing between the skirt portion and the sealing element.

Figure 10:
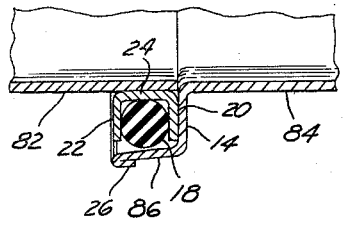
FIGURES 10 and 11 are partial sectional views of another modified embodiment of the invention in successive stages of assembly.
Figure 11:
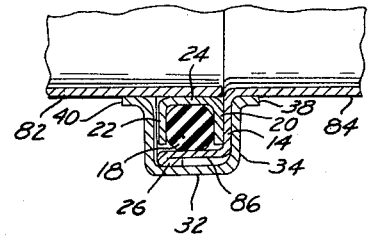

In FIGURES 10 and 11 is illustrated a modified form of the sealing connector of the invention, wherein a compressive sealing force is exerted on the annular resilient sealing element only when the clamping ring is constricted to exert radial constrictive force on a modified skirt portion 86. The skirt portion 86 is inclined or is of such diameter relative to the annular resilient sealing element that it is substantially out of sealing contact therewith until it is deformed or constricted by the constrictive force of the clamping ring. As indicated in FIGURE 11, the clamping ring exerts force on the rim 26 of the skirt portion to exert bending force on the skirt portion to urge it against the sealing element.

From the foregoing, those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and realizing the advantages hereinbefore mentioned, and that the invention is not limited thereto; variations will be readily apparent to those versed in the art, and the invention is entitled to the broadest interpretation within the terms of the appended claims.

The inventor claims:

1. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and extending radially outward therefrom, a radially extending shoulder on the cover section adapted to seat against one of said retaining channel flanges, an axially extending skirt depending from the periphery of said cover shoulder and configurated to engage the periphery of the annular resilient sealing element to compress the sealing element and provide pressure sealing therebetween, clamping means of channel-shaped cross-sectional configuration disposed about the skirt and the sealing element to secure the sections together, and means for constricting the clamping means to exert radially constrictive force urging the skirt inwardly to compress the sealing element, whereby the sections are secured together in sealed relation.

2. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and extending radially outward therefrom, a radially extending shoulder on the cover section adapted to seat against one of said retaining channel flanges, an axially extending resilient skirt depending from the periphery of said cover shoulder and configurated to engage the periphery of the annular resilient sealing element, clamping ring means comprising semi-circular hinged sections of channel-shaped cross-sectional configuration for fitting about said shoulder, skirt and retaining channel, a toggle lever assembly connected with the unhinged end portions of the clamping ring sections, and handle means operatively connected with the toggle lever assembly for movement to a closed position to draw said unhinged end portions of the sections together to exert radially constrictive force to clamp the resilient skirt inwardly to compress the resilient sealing element to provide pressure sealing therebetween, said toggle lever assembly being self-locking when the handle is in said closed position, whereby the sections are secured in fluid-sealing relationship.

3. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and extending radially outward therefrom, a radially extending shoulder on the cover section adapted to seat against one of said retaining channel flanges, an axially extending skirt depending from the periphery of said cover shoulder and configurated to engage the periphery of the annular resilient sealing element to compress the sealing element and provide pressure sealing therebetween, clamping ring means compressing semi-circular hinged sections of channel-shaped cross-sectional configuration for fitting about said shoulder, skirt and retaining channel, first and second lugs on the respective end portions of said clamping ring sections opposite from their hinged ends, toggle link means pivotally mounted on the first lug, a handle pivotally connected to the link means, and an adjustment nut having a nose portion at one end and having at the opposite end a shank portion threadedly engaging said handle, said nose portion being positioned for pivotal engagement in a recess in the second lug, said handle pivoting about said nose portion and recess in moving to a closed position to draw the unhinged ends of the clamping ring sections together, whereby radially constrictive force is exerted on the skirt portion and sealing element to compress the sealing element to provide pressure sealing therebetween, whereby the sections are secured together in fluid-sealing relationship.

4. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and having its outer portion extending radially outward therefrom, a radially extending shoulder on the cover section adapted to firmly seat against one of said retaining channel flanges to provide firm abutment of the cover section against the body section, an axially extending resiliently deformable skirt depending from the periphery of said cover shoulder, said skirt being adapted for mutual resilient engagement with the radially extending portion of the sealing element to compress the sealing element with equalized sealing force all about the body section, thereby providing positive pressure sealing between the body section and said cover section, said seating of the radially extending cover shoulder against said retaining channel flange positively and accurately positioning the skirt relative to the resilient sealing element, and clamping ring means engaging said cover shoulder and disposed about said retaining channel and said skirt to secure said sections together, whereby the cover and body sections are secured in fluid sealing relation.

5. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and having its outer portion extending radially outward therefrom, a radially extending shoulder on the cover section adapted to firmly seat against one of said retaining channel flanges to provide firm abutment of the cover section against the body section, an axially extending thin-walled resiliently deformable skirt depending from the periphery of said cover shoulder, said skirt being adapted for mutual resilient engagement with the radially extending portion of the sealing element to compress the sealing element with equalized sealing force all about the body section, thereby providing positive pressure sealing between said body section and said cover section, said seating of the radially extending cover shoulder against said retaining channel flange positively and accurately positioning the skirt relative to the resilient sealing element, hinged clamping means channel-shaped in cross-section engaging said shoulder of the body section and disposed about said skirt and retaining channel, and means for drawing together the unhinged ends of the clamping means, whereby said sections are secured together in sealed relation.

6. A sealing closure for connecting a body section and a cover section of a cylindrical fluid pressure tank, said closure comprising a retaining channel of U-shaped cross-sectional configuration defined by parallel flanges extending radially outward about the body section, an annular resilient sealing element disposed in said retaining channel and having its outer portion extending radially outward therefrom, a radially extending shoulder on the cover section adapted to firmly seat against one of said retaining channel flanges to provide firm abutment of the cover section against the body section, an axially extending thin-walled resiliently deformable skirt depending from the periphery of said cover shoulder, said skirt being adapted for mutual resilient engagement with the radially extending portion of the sealing element to compress the sealing element with equalized sealing force all about the body section, thereby providing positive pressure sealing between said body section and said cover section, said seating of the radially extending cover shoulder against said retaining channel flange positively and accurately positioning the skirt relative to the resilient sealing element, clamping ring means comprising semicircular hinged sections of channel-shaped cross-sectional configuration for fitting about said shoulder, skirt and retaining channel, first and second lugs on the respective end portions of said clamping ring sections opposite from their hinged ends, toggle link means pivotally mounted on the first lug, a handle pivotally connected to the link means, and an adjustment nut having a nose portion at one end and having at the opposite end a shank portion threadedly engaging said handle, said nose portion being positioned for pivotal engagement in a recess in the second lug, said lever pivoting about said nose portion and recess in moving to a closed position to draw the unhinged ends of the clamping ring sections together, whereby the sections are secured together in fluid-sealing relationship.

References Cited by the Examiner

UNITED STATES PATENTS

| 1,312,626 | 8/1919 | Grannis | 220—46 |
| 1,482,049 | 1/1924 | Swanson | 292—256.69 |
| 3,154,829 | 11/1964 | Pahel et al. | 285—367 |

FOREIGN PATENTS

| 343,406 | 2/1931 | Great Britain. |

THERON E. CONDON, *Primary Examiner.*

G. T. HALL, *Assistant Examiner.*